United States Patent [19]

Minardi et al.

[11] Patent Number: 4,791,784
[45] Date of Patent: Dec. 20, 1988

[54] INTERNAL BYPASS GAS TURBINE ENGINES WITH BLADE COOLING

[75] Inventors: John E. Minardi; Hans P. von Ohain; Maurice O. Lawson, all of Dayton, Ohio

[73] Assignee: University of Dayton, Dayton, Ohio

[21] Appl. No.: 39,053

[22] Filed: Apr. 16, 1987

Related U.S. Application Data

[63] Continuation-in-part of Ser. No. 745,964, Jun. 17, 1985, abandoned.

[51] Int. Cl.⁴ .............................................. F02K 3/02
[52] U.S. Cl. ..................................... 60/262; 60/39.19; 416/242
[58] Field of Search ................... 60/262, 39.07, 39.19, 60/39.83; 415/115; 416/97 R, 242, 183

[56] References Cited

U.S. PATENT DOCUMENTS

| | | | |
|---|---|---|---|
| 2,401,826 | 6/1946 | Halford | 60/39.83 |
| 2,614,384 | 10/1952 | Feilden . | |
| 2,873,945 | 2/1959 | Kuhn | 415/115 |
| 3,108,767 | 10/1963 | Eltis et al. . | |
| 3,333,817 | 8/1967 | Rhomberg | 416/242 |
| 3,464,357 | 9/1969 | Duport et al. | 416/242 |
| 3,542,486 | 11/1970 | Kercher et al. | 416/97 R |
| 3,574,477 | 4/1971 | Dolf et al. | 416/242 |
| 3,582,232 | 6/1971 | Okapuu | 416/97 R |
| 3,742,706 | 7/1973 | Klompas | 416/97 R |
| 3,751,909 | 8/1973 | Kohler | 415/115 |
| 3,826,084 | 7/1974 | Branstrom et al. | 415/115 |
| 3,994,630 | 11/1976 | Rodgers | 416/97 R |
| 4,086,760 | 5/1978 | Chute | 60/39.83 |
| 4,296,599 | 10/1981 | Adamson | 415/115 |
| 4,302,148 | 11/1981 | Tubbs | 415/115 |
| 4,384,823 | 5/1983 | Graham et al. | 415/115 |
| 4,462,204 | 7/1984 | Hull . | |
| 4,507,051 | 3/1985 | Lesgourgues et al. | 416/97 R |
| 4,571,937 | 2/1986 | Albers | 416/97 R |

FOREIGN PATENT DOCUMENTS 3243848 11/1982 Fed. Rep. of Germany .

Primary Examiner—Donald E. Stout
Attorney, Agent, or Firm—Biebel, French & Nauman

[57] ABSTRACT

A gas turbine having internal cooling and method of operating the same includes the bypassing of a portion of the cool air from the compressor section into the turbine section along the suction side of the turbine blades while maintaining stable flow conditions in which there is relatively low intermixing between the cool airflow on the suction side and the hot gases on the pressure side.

2 Claims, 7 Drawing Sheets

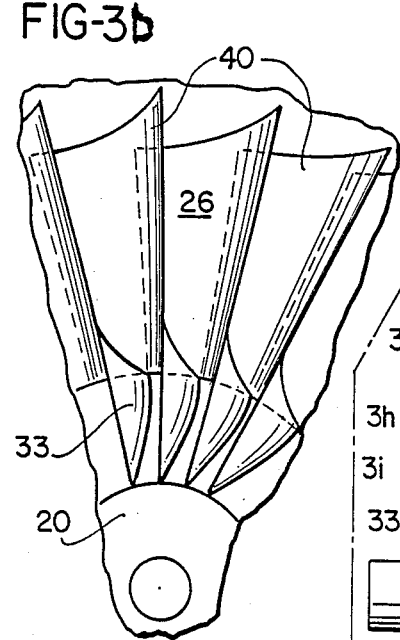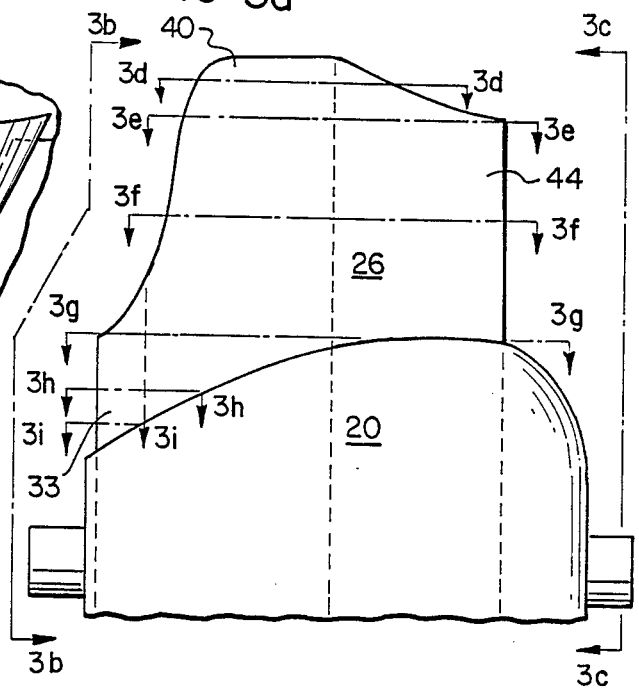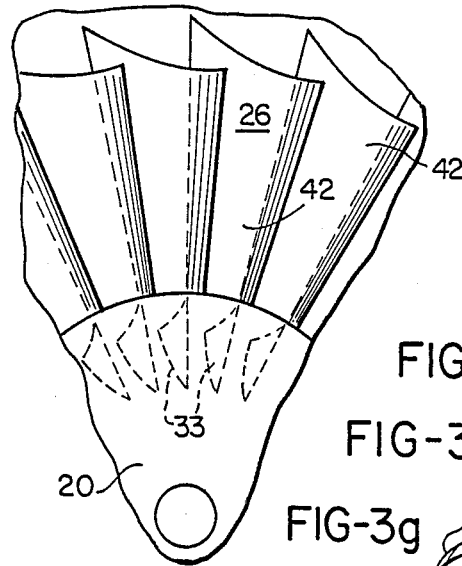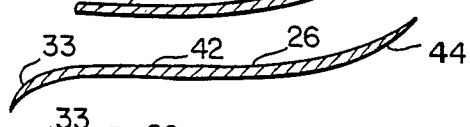

INTERNAL BYPASS GAS TURBINE ENGINES WITH BLADE COOLING

RELATED APPLICATION

This application is a continuation-in-part application of Ser. No. 745,964 filed June 17, 1985, now abandoned.

BACKGROUND OF THE INVENTION

One of the most critical problems in small gas turbines, such as for missiles, trainers, small military or business aircraft, general surface transportation and ground power, is the difficulty associated with achieving strong and efficient turbine blade cooling with reliable, simple and inexpensive turbine blade structures. In such gas turbines, the turbine blades are usually too small to employ the turbine blade cooling techniques as used for large gas turbines.

The growing need for effective blade cooling techniques in small gas turbines is a direct consequence of the continuous quest for greater fuel economy. Greater fuel economy necessitates higher compressor pressure ratios and correspondingly higher isentropic compressor exit temperature ($T_{c,e,s}$). In turn, the turbine inlet temperature (TIT) must be raised, since the thermal efficiency of the Brayton cycle, with non-ideal components, begins to drop rapidly when the ratio of TIT/$T_{c,e,s}$ decreases below 2. For example, for a compressor pressure ratio of about 30:1, $T_{c,e,s}/T_{amb}=2.64$: thus TIT/$T_{amb}=5.28$, and TIT=2750° R. at an ambient temperature ($T_{amb}$) of 520° R.

Current attempts to make ultrahigh, turbine-inlet gas temperatures possible are based on the use of turbine materials having ultrahigh temperature and stress capabilities such as advanced ceramics or advanced composite materials, or the use of oxidization resistant coatings for exotic turbine-blade materials such as Columbium and others. Solving the high-temperature problems by the use of uncooled, novel materials entails many risks and uncertainties with respect to development time, cost and ultimate reliability.

SUMMARY OF THE INVENTION

The present invention is directed to a novel method and apparatus by means of which turbine blades in gas turbines are cooled by internal bypass air. Embodiments are disclosed of monorotor and radial-axial (radiax or mixed-flow) designs, incorporating the teachings of this invention.

In all of the embodiments, the cooling air passes within the engine from the compression section to the turbine section, and is admitted to the turbine, in relation to the configuration of the blades, at an upstream position. The cooling air remains separated from the combustion gases, which gases flow along essentially separate pathways in a relatively stable condition so that there is a minimum intermixing of the hot gases at the turbine blades with the cooling air, and a minimum of lost efficiency. For this purpose, means defining passageways are formed between the compressor and turbine sections, which permits a portion of the air from the compressor or the fan to bypass the combustion section of the engine. This relatively cold air becomes available in the turbine section for cooling of the turbine blades.

A principal object and advantage of the method and apparatus of this invention is that the simplest possible turbine blade construction is permitted, eliminating the need for hollow or internally cooled blades, thus providing for a high efficiency small size turbine.

The invention includes a novel turbine blade arrangement, in which solid blades are employed, and in which radially inner and forward portions of the blades define cool air inlet sections. These sections receive cooling air from the internal bypass, and compress the cooling air and accelerate the flow between the blades. As the cool air enters the wider spaces between the blades at radially outer portions of the blades, the cool air tends to follow the hub surfaces and adheres to the suction side of the blades.

Radially outer portions of the blades define hot gas inlet sections and receive the hot gases from the combustion section of the turbine and act as conventional turbine or reaction pressure surfaces, through which energy is transferred from the gases to the rotor as the gases pass through the turbine and against the pressure sides of the blades.

A further object and advantage of the invention is the provision of a method and apparatus by means of which highly effective cooling of the turbine blades can be obtained with the smallest penalty in efficiency. A miminum loss of efficiency and loss of cooling is maintained by reason of the fact that the respective hot and cold gases form into separate flow layers which are essentially stable flow sheets, in which the hot gases maintain their integrity of flow on the pressure side of the turbine blades while the cold air forms its flow sheet on the suction side. The interface between the respective layers is "Taylor-stable" by reason of tee curvature of the flow passage and further by reason of the fact that the total pressure of the hot gases is considerably greater than the total pressure of the cold gases.

The present invention provides intense cooling of the turbine blades, and it is predicted and estimated that the actual blade temperature will be only slightly greater than the arithmetic mean of the temperatures of the hot and cold flow layers.

Accordingly, a dual stream blade cooling method is achieved which permits utilization of solid blades, which are cooled on one blade side with intense cooling from the leading edge to the trailing edge, and with small performance penalty as compared to uncooled blades. The invention permits the exploitation of the inherent advantages of using solid blades, with the corresponding structural simplicity and lower manufacturing cost, providing gas turbines which are particularly suitable for small size high performance applications. For example, such applications include low power output gas turbine engines which cannot otherwise employ conventional turbine blade cooling by reason of the small physical dimensions of the blades. Low aspect ratios of solid turbine blades provide rugged and yet simple and relatively inexpensive turbine rotor structures which may lend themselves to die-casting manufacturing processes. Further, such low aspect ratio turbine vanes and rotor structure may permit the use of brittle high temperature turbine materials, such as ceramics or composite materials and may permit the use of a layer of thermal barrier material attached to the pressure side of the blades exposed to the hot gas stream.

Accordingly, the favorable performance characteristics of turbines made according to the present invention permit the broadening of application of small gas turbines in areas where their use has not heretofore been economical, such as for small business and military aircraft, unmanned aircraft and drones, surface transportation, and ground power applications. Such small turbine engines, not now presently available at reasonable cost, are particularly suitable for low level subsonic flight missions at short to medium flight ranges. The use of highly strategic or high-cost materials is reduced or avoided.

It is accordingly an object of the invention to provide a turbine in which turbine blades are provided with a cool air compressor portion and a hot gas reactor portion, in which the compressor portion receives cool bypass air and in which the reaction portion of the blades receives hot gases from a combustion section for imparting energy to the turbine, and in which the cool air and hot gas portions are physically separated in that the cool air inlet portion is positioned radially inwardly of the hot gas reactor portion.

A particular advantage of the invention is the fact that the respective hot gases and cooler gases remain in flows which are separate and which coexist in the turbine, with the hot gases following the pressure side of the blade and the cold gas or cooling air flow following the radially inner portions of the blade along the suction side of the blade, to provide a strong cooling effect.

Another important object of the invention to provide a turbine, and method of operating the same, in which bleed air, preferably in the form of bypass air, is brought in and its integrity maintained, without substantial mixing with the combustion gases, and applied to one side of the external surfaces of the turbine blades for the purpose of cooling the blades.

Another object of the invention is the provision of a turbine, and method of operating the same, in which the turbine rotor and blades may be formed solid, or free of internal passageways or conduits for cooling purposes.

A further important object is the provision of a monorotor turbine and a radiax turbine in accordance with the principles of the invention as outlined above.

A further object of the invention is the provision of a relatively low-cost small turbine which may utilize solid blades with external cooling, with a capability of working at relatively high pressures and temperatures.

A still further object of the invention is the provision of a gas turbine incorporating the principles outlined above in which the compressor and turbine are combined in a single rotor, so that the cooling air may pass within the rotor from the compressor section to the turbine section directly, thereby avoiding the necessity for the cooling air to leave the rotor and re-enter the turbine at a downstream point.

A still further object is the provision of a gas turbine in which intense cooling of the turbine blades is effected by application of a small amount of bypass air directly to the exterior blade surfaces, such as at the suction surface, in a manner in which there is minimal intermixing between the bypass cooling air and the hot accelerated gases from the combustion chamber, to the end that the efficiency losses are comparable to or superior to conventional blade cooling configurations.

These and other objects and advantages of the invention will be apparent from the following description, the accompanying drawings, and the appended claims.

BRIEF DESCRIPTION OF THE DRAWING

FIG. 3A is a longitudinal section similar to FIG. 3 of the turbine rotor portion;

FIG. 3B is a fragmentary front elevational view of the rotor looking along the lines 3B—3B of FIG. 3A;

FIG. 3C is a rear fragmentary elevational view of the rotor looking generally along the lines 3C—3C of FIG. 3A;

FIGS. 3D through 3I are transverse sectional views through one of the turbine blades taken respectively along the view lines D, E, F, G, H and I of FIG. 3A;

DESCRIPTION OF PREFERRED EMBODIMENTS

Figure 1:
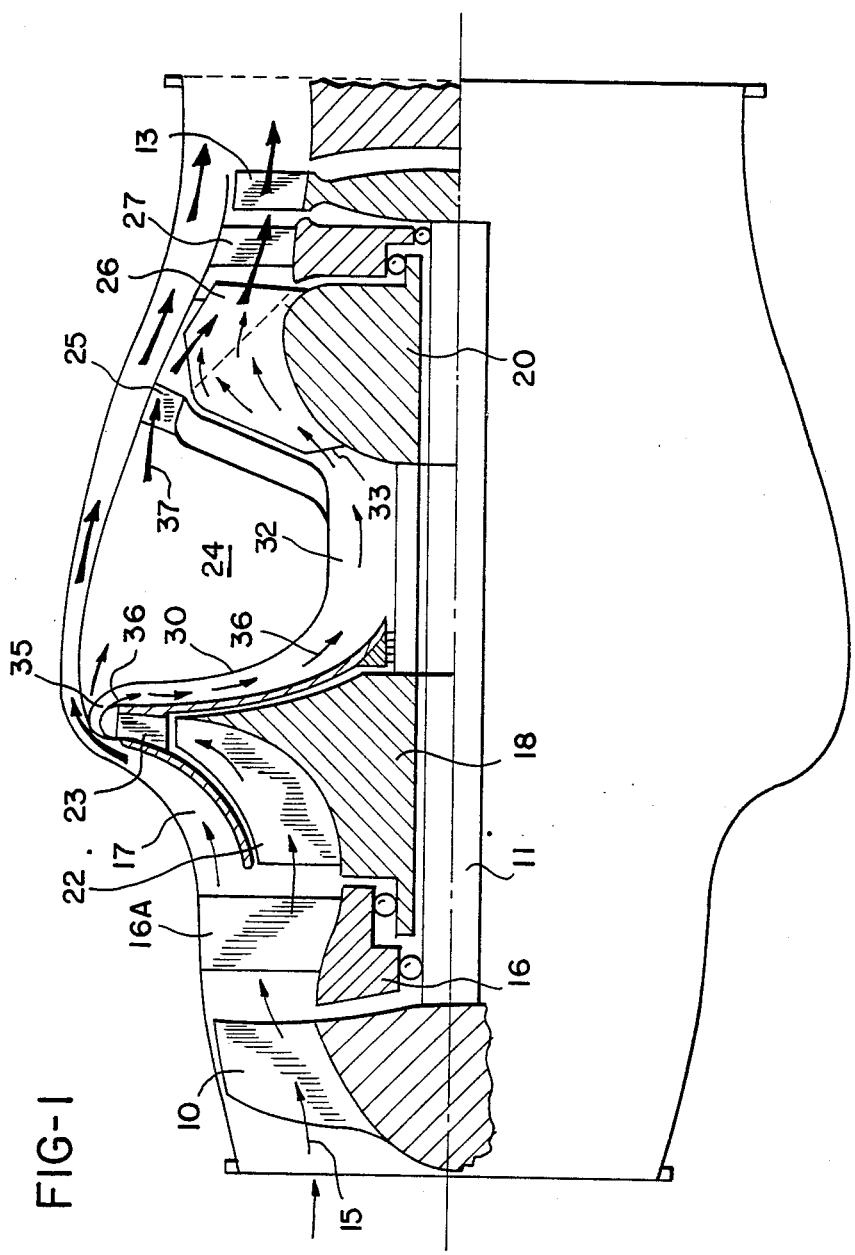
FIG. 1 is a schematic view of a mixing fan engine having an air-cooled radiax turbine in accordance with this invention.

Referring first to FIG. 1, an air cooled radiax turbine is shown, embodied in a mixing fan engine employing both external bypass, add an internal bypass arrangement constructed according to the teachings of this invention. A high pressure ratio inductor fan 10 at the inlet is mounted on a shaft 11 in common with a fan turbine 13 at the outlet. The fan 10 induces airflow along the paths of the arrows 15 into the engine and through the fixed vanes 16a of a stator bearing holder 16.

A portion of the air from the inductor fan 10 is bypassed externally of the engine through a conventional external bypass passageway 17 and exits at the back of the engine, again in a conventional manner.

Figure 2:
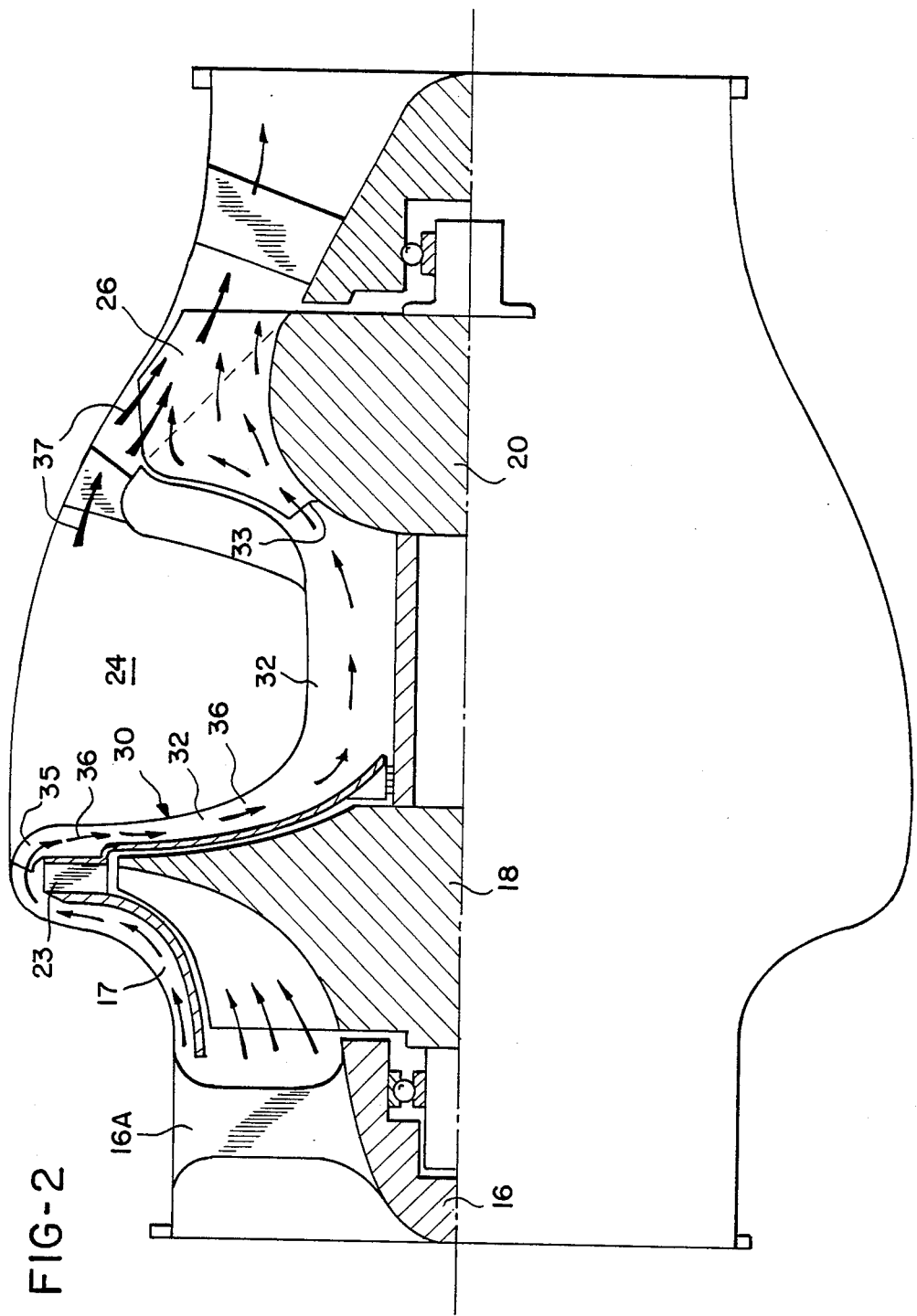
FIG. 2 is an enlarged schematic view of an internal bypass engine similar to the engine of FIG. 1 using a radial flow compressor.

High pressure ratio radial outflow compressor sections 18 of the engines of both FIGS. 1 and 2 are driven by a radiax turbine 20. The compressor section 19 includes radial outflow backward bent compressor blades 22, discharging through a diffuser 23 into a combustion chamber 24. The nozzles in the combustion chamber are not shown. Hot gases exit from the combustion chamber 24 through an inlet stator 25 for the high pressure radiax turbine 20. The blades 26 of the turbine 20 receive the high pressure flow from the turbine inlet stator 25, with the exit flow through a bearing holder and stator 27 to the fan turbine 13 (FIG. 1).

Conduit means for applying or conveying a portion of bypassed air internally from ahead of the radial compressor to the turbine blades is illustrated generally at 30 in FIGS. 1 and 2. The reference numeral 30 designates one of two or more peripherally or arcuately spaced discrete conduits. Each conduit forms a radially inwardly then generally axially extending passageway 32 which leads from an inlet region adjacent the diffuser 23 to the inlet region 33 of the turbine blades 26. The conduits 30 are formed with inlet discrete openings 35 in the bypass passageway 17 and receive a relatively small portion of the total air. The cooling air conveyed by the conduit means 30 is represented by the relatively smaller arrows 36 in FIGS. 2 and 3, as compared to the larger arrows 37 representing the flow of heated air from the combustion chamber 24.

Figure 3:
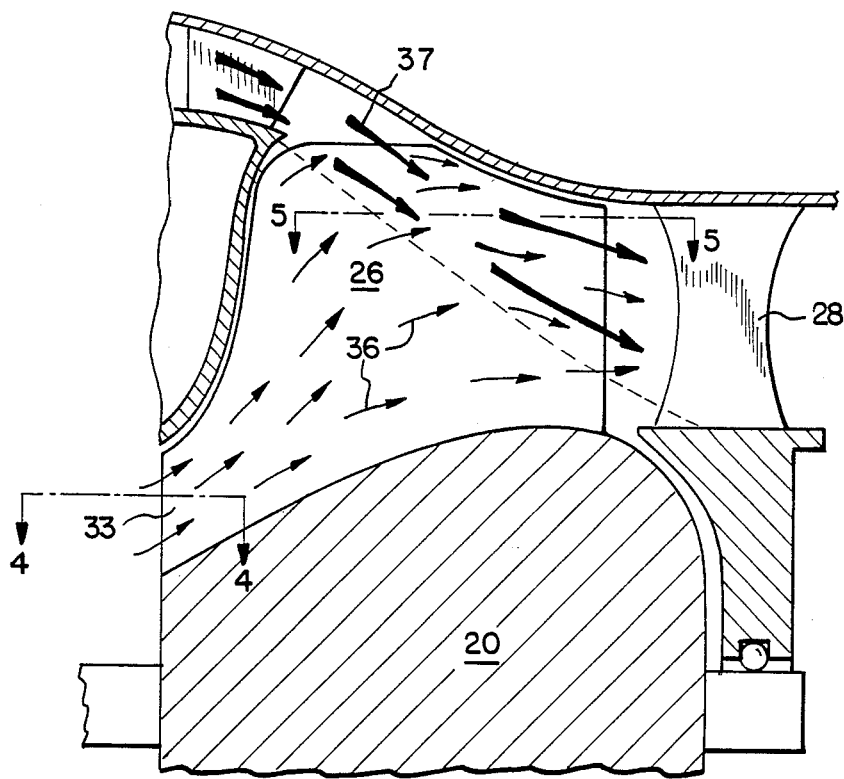
FIG. 3 is an enlarged fragmentary sectional view of a portion of the turbine section of the engine of FIG. 1.
Figure 5:
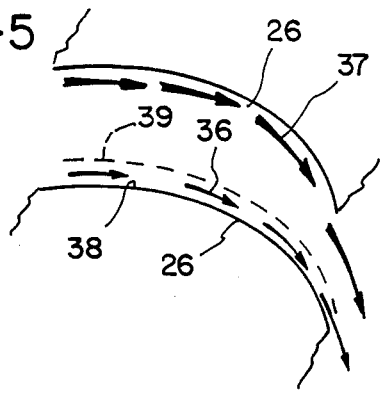
FIG. 5 is a fragmentary sectional view through two of the turbine blades, showing the airflow routes thereover, taken generally the line 5—5 of FIG. 3.

As perhaps is best shown in FIG. 3, the conduit means 30 applies the relatively cold low energy air to the inlet regions 33 of the turbine blades 26, which air tends to flow closely along and against the suction sides 38 of the blades, as illustrated in FIG. 5. An interface 39 is maintained between the flows represented by the high energy gases from the combustion chamber 24 represented by the heavy arrows 37, and the relatively low temperature flow represented by the small arrows 36. The interface 39 between the two respective layers is "Taylor-stable" because of the curvature of the flow passage between the blades, and because of the fact that the total pressure of the hot gases is considerably greater than the total pressure of the cold airflow. In other words, the hot gases directed to the pressure side of the turbine blades from the combustion chamber 24, through the stator vanes 25, forms a stable flow sheet on the pressure side of the vanes while the cold airflow forms a flow sheet on the suction side of the turbine blade psssageways.

The hot gases enter the turbine blades 26 at a radially outer hot gas inet region 40 and, as illustrated by the arrows 37 in FIG. 3, with a strong axial component. The cold air inlet section 33 where the cold gases enter the turbine wheel, acts like a compressor inlet, and somewhat compresses the cold gases which enter the turbine section. The flows stay generally separate and co-exist in the turbine, as shown in FIG. 5, with the ho gases going to the pressure side of the blade, conventionally, and the cold gas flow going to the suction side, to produce a strong cooling effect to the individual blades from the hub to the blade tips, with minimal reduction to turbine efficiency.

In spite of the fact that Taylor-Görtler vortices will be formed in each of the respective flow interfaces, and in spite of the relatively different flow vectors and velocities therebetween, the interface remains substantially stable even though some intermixing between the hot gas and the cold air is inevitable. It is believed that overall turbine performance is not adversely affected by such mixing, as compared to the substantial gain in engine performance by reason of the intense cooling of the invidiual turbine blades.

The blades 26 may be solid, since the need for internal cooling is eliminated. This therefore permits the exploitation of the inherent advantages of solid air-cooled blades, namely, structural simplicity, relatively low manufacturing cost, high stability and strength, all of which are particularly suitable for small size, high performance gas turbines.

Reference may be had to the views of FIGS. 3A–3I for a further understanding of the preferred construction of the improved turbine and turbine blades of this invention. As shown, the blades 26 are solid. Each blade is formed with a forward radially inner cold air inlet section 33. The inlet section 33 exclusively receives cool bypass air and is formed generally at the forward and radially inner vertical edge of the blade. The cool air inlet section 33 is shown in FIG. 3B and in views 3G, 3H, and 3I as having a forward turned curvature, generally opposite of that from the curvature of the radially outer turbine inlet section 40. Sectional views 3H and 3I illustrate the shape of the blade 26 at stations or view lines which are relatively close to the turbine hub 20 while view 3G illustrates the shape of the full axial extent of the blade leading from the cool air inlet section 33 to a common exit 44. It will be noted that the blade is formed with a relatively straight intermediate section 42, and an exit portion 44 which is curved opposite to that of the inlet section 33.

Figure 4:
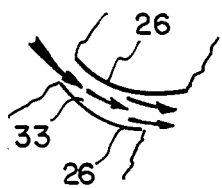
FIG. 4 is a fragmentary sectional view through two of the turbine blades taken generally along the line 4—4 of FIG. 3.

The cold air inlet sections 33 of the blades define relatively small forward and radially inner parts of the blade and are physically separate and remote from the hot gas inlet section 40. Further, the volume defined by the spaces between the blade increases at stations radially outwardly of the blade and the hub 20 so that the actual volume of space between the blades at the turbine inlet section 40 is substantially greater than that at the cold air inlet section 33. This relationship may be seen by comparing the space between the pair of blades 26 shown in FIG. 4, taken at the cold air inlet section, and FIG. 5, taken at the hot gas inlet section leading to the common exit section. Accordingly, the cold flow as illustrated by the arrows 36 will tend to remain adjacent the hub and, as the air progresses will remain along the suction side of the blades, as illustrated in FIG. 5.

The number of individual cold air conduit means defining the discrete passageways 32 is a matter of design choice. For symmetry, as few as two may be used at 180° from each other, with the upper limit being a practical one, taking into consideration the physical dimension of the conduit 30 as required to move the requisite amount of bypass air, which air seldom will exceed more than approximately 15 per cent of the total air flow.

Figure 6:
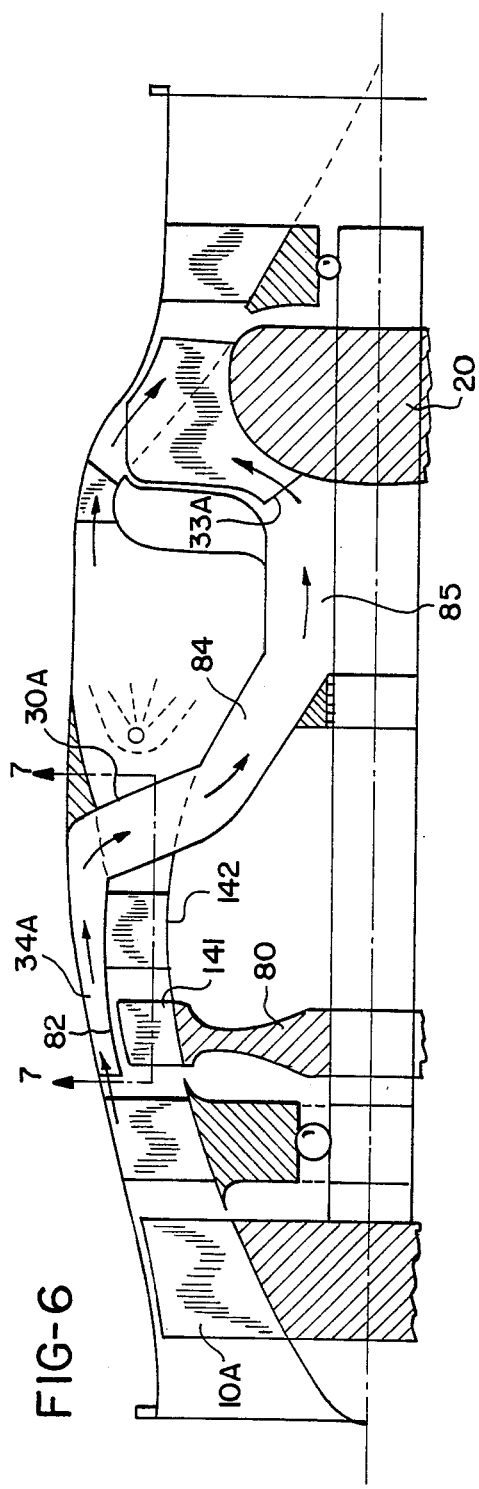
FIG. 6 is a schematic sectional view of an internal bypass radiax turbine engine employing an axial flow compressor.
Figure 7:
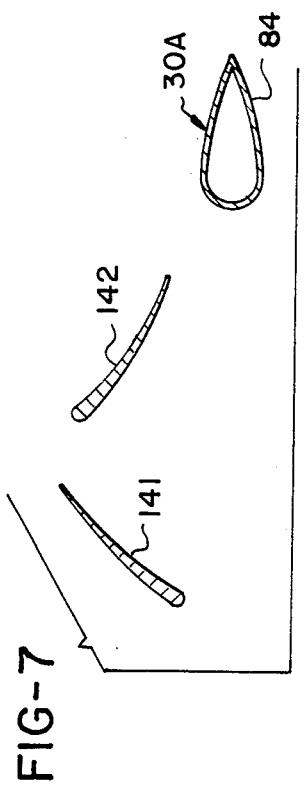
FIG. 7 is a diagram showing the compressor blade element and bypass configuration of the engine of FIG. 6.

A schematic view of an internal bypass radiax engine using an axial flow compressor is illustrated in FIG. 6 in which like parts have been given like reference numerals with the suffix "a". The embodiment of the invention is applied to an axial flow compressor and shows the manner in which passageway 30a opens at a region 34a radially outwardly of the blade shroud of a conventinal axial compressor 80 to receive the bypass air from the inductor fan 10a. The conduit means 30a, as shown in FIG. 7, may take the form of a pluralty of thin hollow airfoil shaped bypass struts 84 leading to a common plenum region 85 for application to the inlet section 33a of the turbine 20a as in the embodiment of FIGS. 1–5.

Figure 8:
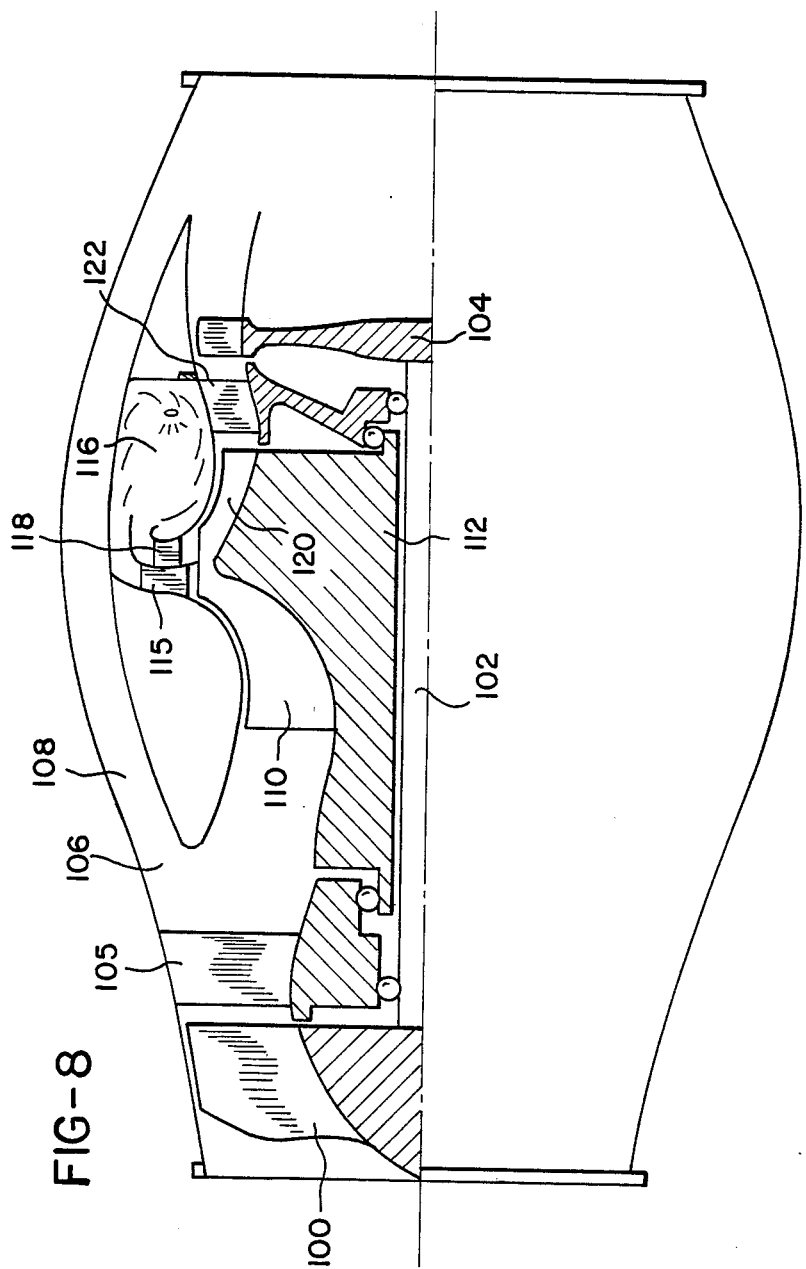
FIG. 8 is a partially schematic sectional view of a mixing fan engine employing a monorotor having internal bypass.
Figure 9:
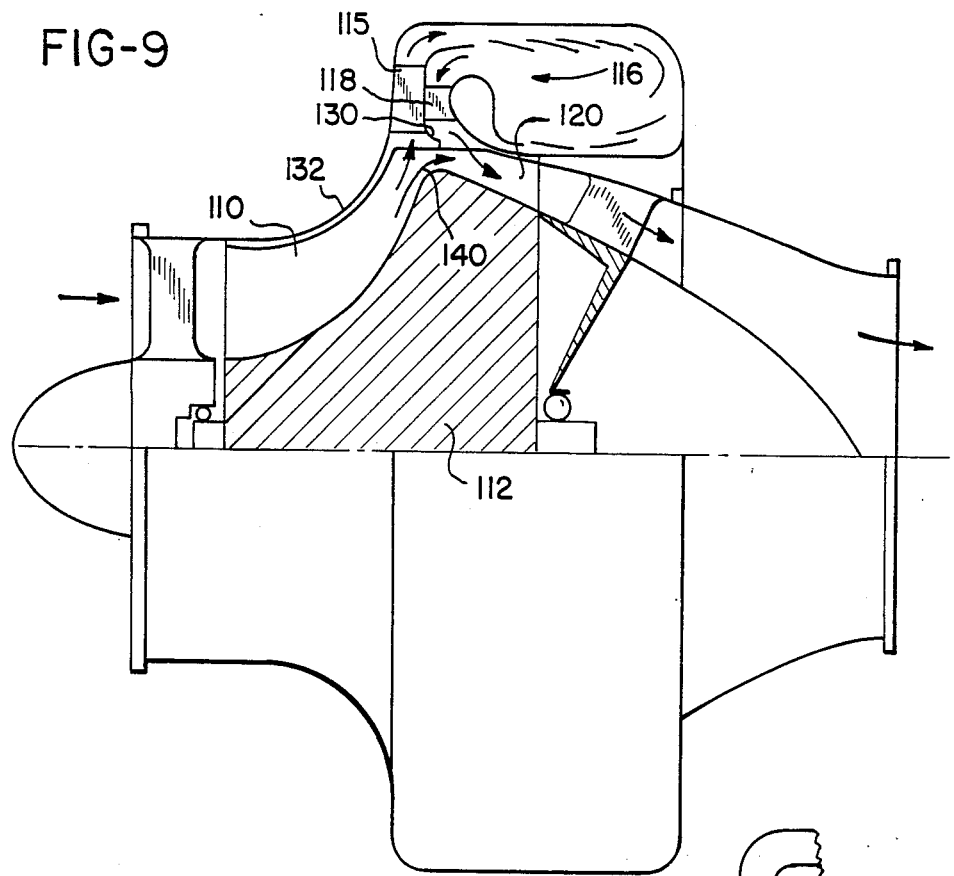
FIG. 9 is a schematic sectional view of a simple monorotor engine.
Figure 10:
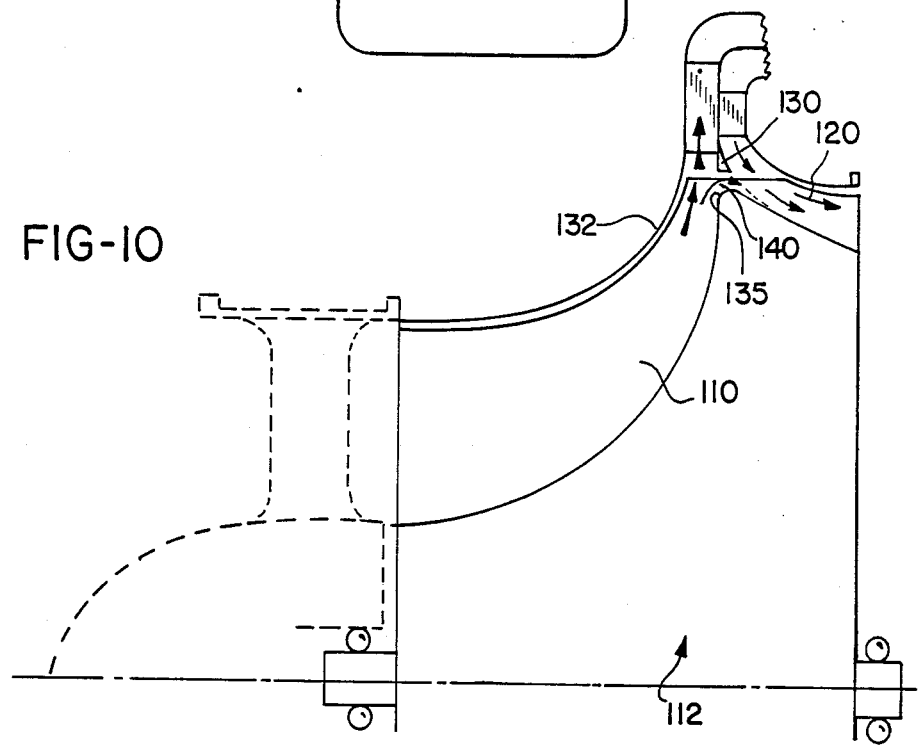
FIG. 10 is an enlarged schematic view of the monorotor bypass region.

The principles of the present invention may be advantageously applied to a monorotor turbine engines, as shown in FIGS. 8, 9 and 10. Like reference numerals are used for like parts. FIG. 8 is a schematic view of a mixing fan engine with internal bypass and a monorotor core. The inductor fan is shown at 100 mounted on a shaft 102 in common with an exit fan turbine 104. The fan 100 delivers air through a stator and bearing holder 105 to an internal region 106 at which point a portion of the air from the fan 100 is bypassed through an annular external conduit or passage 108, and the remaining portion is applied to the inlet of the generally radial compressor blade section 110 of a monorotor 112. The inlet blade section 110 compresses the air in a conventional manner through a diffuser 115 and into a combustion chamber 116. Hot accelerated gases are delivered by the chamber 116 through turbine inlet stator vanes 118 to the turbine blade section 120 also carried on the core or rotor 112. The gases exit through a bearing holder and stator 122 for the turbine fan section 104.

FIG. 9 is a simple monorotor engine suitable for inexpensive lower performance applications. The air is immediately compressed by the monorotor compression section 110 and exits through a diffuser 115 into combustion chamber 116. Hot accelerated gases are delivered by the chamber 116 through turbine inlet stator 118 to the monorotor turbine blade section 120. The gases exit the engine after leaving the blade section 120 and produce the engine thrust.

Referring to FIG. 10, in which the details of the internal bypass monorotor are shown in somewhat greater detail, it will be seen that if the center body of the core 112 were extended radially at the top of the rotor to the wall 130 of the surrounding case 132, it would in effect split the rotor into two component parts. An upstream part including the blades of the compressor section 110 would be essentially a standard radial flow compressor, and a downstream part including the blades of the turbine section 120, which would essentially be a standard radial inflow turbine or a diagonal turbine. However, it will be seen that the rotor body 112 does not extend all the way to the wall 130 of the case 132. Rather, it terminates at a radially outer region 135 somewhat inwardly of the wall 130 of the case 132 to define an axial bypass passageway 140 between the compressor blades 110 and the turbine blades 120. The bypass passageway 140 permits a small amount of the compressed cold air from the compressor section 110 to be admitted into the turbine section. This cold and compressed air is then available in the turbine section for the cooling of the turbine blades. As can be seen in FIGS. 8-10, this concept results in compact simple and small engine designs.

The major flow path characteristics can be described as follows: Air in the compressor section is handled as in a standard radial outflow or modern ultrahigh performance compressor up to the compressor rotor exit, leading to the diffuser 115 and the combustion chamber 116.

The compressor diffuser 115, the turbine nozzle 118, and the gas passage design 140, are preferably tailored in such a manner that the static pressure at the turbine rotor entrance region is equal to the static pressure of air leaving the compressor rotor. Accordingly, the cold air and the hot turbine gas form, in each turbine blade passage, two separate airflows. The hot gas forms a stable flow sheet on the pressure side of the blade, while the cold air forms a flow sheet on the suction side of the turbine blade passages. Again, the interface between these two layers is Taylor-stable because of the curvature of the flow passage and the fact that the total pressure of the hot gas is considerably greater than the total pressure of the cold air (both observed from the coordinate system of the turbine blade passage). In spite of the stability of the interface, again some mixing between the layers would be inevitable, but would not be expected adversely to affect turbine performance.

The cooling which results to the turbine blades is intense, and estimates of blade temperature indicate that the temperature is only slightly greater than the arithmetic mean of the temperatures of the hot and cold layers.

While the proposed bypass cooling method and apparatus, as disclosed herein may require a substantially greater amount of cooling air than that required for conventional hollow blade turbines, the energy losses in the cooling air are substantially smaller than in conventional blade cooling configurations. At the highest operational rotor speed, the required cooling air may be as high as about 15 percent of the total compressor airflow, in the case of the monorotor embodiments of FIGS. 8-10.

To achieve the highest performance with radial flow compressors, it is necessary to employ backward bent blades, which reduces the Mach number and kinetic energy at the diffuser entrance, and which furnishes a favorable margin between the surge line and best compressor efficiency.

The efficiency as well as the efficacy of the method and apparatus resides in the fact that the cold and hot flows can coexist in a common passageway while rotating at high speed and moving axially at different rotational velocities, although this condition is more critical for the monorotor design than for the radiax designs in view of the presence of the common passageway 140 leading to the turbine blade section 122. There is, of course, a substantial difference in the densities and velocities of the two flows. Initially, if both flows are stable hey can be expected to remain stable throughout any interaction, and flow through a curved channel would be expected to produce the least amount of activity at the interface between the two flows. In some instances, while interaction may be predicted along the interface between the two flows, and while a momentum exchange process may occur, it is expected that irreversible mixing will be slight.

It will therefore be seen that the method and apparatus of the present invention is particularly applicable to small and medium power output gas turbines. Since small power output gas turbine engines cannot employ conventional turbine blade cooling methods such as internally cooled hollow blades, solid blades may be used. The cooling arrangement leads to low aspect ratio solid turbine blades permitting rugged and yet simple rotor structures. The engines have very high turbine component efficiency and a near 50 percent reaction degree with highest possible turbine tip speeds, and high specific turbine work output per unit mass of flow medium. The benefit of the internal bypassed air for blade cooling should have at least an equal if not greater effect on propulsive efficiency than the loss of thermodynamic efficiency caused by the bypass air. An internal bypass monorotor can be designed for low axial rotor thrust, thus reducing the demands on a lubrication system and permitting the employment of smaller diameter support bearings. The employment of the present invention may reduce or eliminate the need for strategic materials in the turbine section.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. In a gas turbine engine having a compressor section, a combustion section, and a mixed-flow turbine, the improvement comprising:

a turbine hub, means mounting said hub for rotation, a plurality of solid turbine blades extending generally radially from said hub and extending generally axially along said hub from a forward end of said hub toward a rearward end thereof, each of said turbine blades having an axially forwardly extending cold air inlet portion positioned closely adjacent said hub and further having a hot air inlet reaction portion positioned radially outwardly and axially rearwardly of said cold air inlet portion, said blades having outer edges which taper from a minimum diameter at said cold air inlet portion radially outwardly and axially rearwardly therefrom to a substantially maximum diameter at said hot gas inlet reaction portion, the volume defined by the spaces between adjacent said blades increasing along the axial length of said blades from a minimum at said cold air inlet portions to a substantially greater volume at said hot gas inlet reaction portions, said blades having common gas outlet portions at the trailing edges thereof, means for applying cold bypass air from said compressor section exclusively to said cold air inlet portions of said blades, and means for applying hot gases from said combustion section exclusively to said hot gas inlet reaction portions of said blades.

2. The engine of claim 1 in which said blades are curved toward the direction of rotation of said cold air inlet portion and slope away from the direction of rotation at said common gas outlet portion.

* * * * *